E. S. ABBOTT.
RUBBER HEEL.
APPLICATION FILED MAY 11, 1912.
1,112,749.
Patented Oct. 6, 1914.
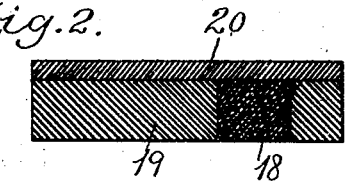
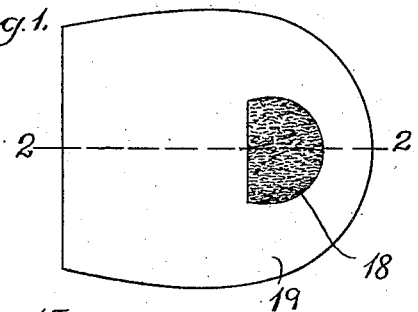
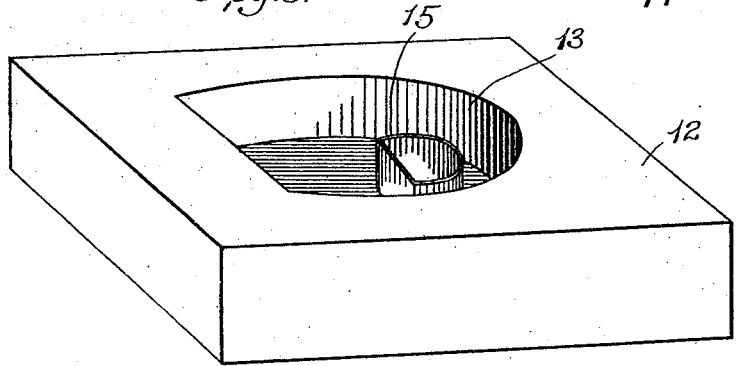
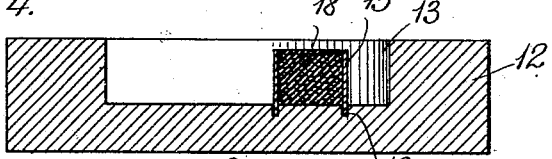
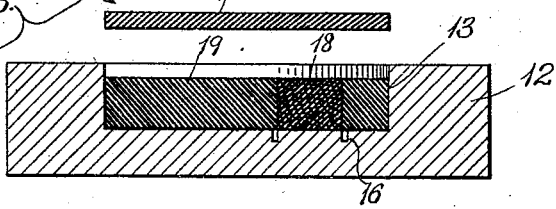
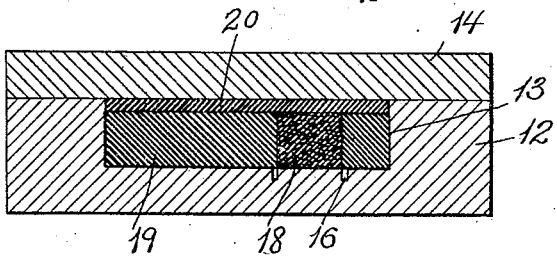
Witnesses:
F. R. Roulstone
P. N. Pezzetti
Inventor:
Essex S. Abbott
by Knight Bros. Quinby May
Attys.

UNITED STATES PATENT OFFICE.

ESSEX S. ABBOTT, OF MALDEN, MASSACHUSETTS.

RUBBER HEEL.

1,112,749.     Specification of Letters Patent.     Patented Oct. 6, 1914.

Application filed May 11, 1912. Serial No. 696,666.

*To all whom it may concern:*

Be it known that I, ESSEX S. ABBOTT, a citizen of the United States, residing at Malden, in the county of Middlesex and State of Massachusetts, have invented a certain new and useful Improvement in Rubber Heels, of which the following is a specification.

This invention has for its object the production of a durable and efficient elastic rubber heel for boots and shoes, in which liability to slip on smooth surfaces shall be reduced to the minimum, the heel being adapted for attachment as a cushioning lift to an ordinary rigid heel in the usual manner.

The invention consists in the improvements which I will now proceed to describe and claim.

Of the accompanying drawings forming a part of this specification, Figure 1 represents a plan view of a rubber heel constructed in accordance with my invention. Fig. 2 represents a section on line 2—2 of Fig. 1. Fig. 3 represents a perspective view of the heel mold hereinafter referred to. Fig. 4 represents a longitudinal section of the mold shown by Fig. 3, showing the manner of forming the anti-slipping filling forming a part of the improved heel. Fig. 5 represents a sectional view of the body-forming portion of the mold, the filling forming portion being removed and the filling and body assembled in the mold, the binding layer hereinafter referred to being shown separately. Fig. 6 represents a view similar to Fig. 5, showing the binding layer in place and the mold closed preparatory to the vulcanization of the rubber parts.

The same letters of reference indicate the same parts in all of the figures.

In carrying out my invention I provide a mold 12 having a heel-forming cavity 13 and adapted to be closed by a cover 14, the whole forming a vulcanizing mold adapted to confine unvulcanized rubber parts while they are being vulcanized in the usual manner.

15 represents a removable inner mold formed to enter the cavity 13 and to detachably engage the bottom thereof, the mold 15 having thin walls of sheet brass or other suitable material. The bottom of the cavity 13 may have a groove 16 adapted to receive the lower edge of the removable mold 15, and retain the latter suitably spaced from the marginal walls of the cavity 13, the mold 15 being removable from said groove. The removable inner mold being in place, it is filled with a filling 18 composed of a mixture of unvulcanized rubber and a suitable anti-slipping material, preferably fibrous. I have used with satisfactory results fibers of wool or animal hair, the fibers extending irregularly through the rubber and being more or less separated from each other thereby, as indicated by Fig. 1. The rubber ingredient of the filling therefore extends continuously through the filling and is exposed on the surfaces thereof so that it is adapted to be firmly united to the body and binding layer of the heel by vulcanization, as hereinafter described. After the filling 18 is thus formed I remove the inner mold 15, and form in the portion of the cavity 13 which surrounds said filling a heel body 19 of homogeneous unvulcanized rubber, that is, rubber whether adulterated or not, of the character ordinarily used for rubber heels and not mixed with anti-slipping material. The body 19 is in close contact with the filling, as indicated by Fig. 5. I prefer to next cover the upper surfaces of the body 19 and filling 18 with a binding layer 20 of homogeneous unvulcanized rubber, the thickness of the said body and filling being less than the depth of the cavity 13, so that the top of the layer 20 is about flush with the upper surface of the mold 12. The cover 14 is now applied and secured and the mold is subjected to heat suitable to vulcanize the rubber of the assembled parts which are thus firmly united. The product is the heel represented by Figs. 1 and 2, having the anti-slipping core 18 exposed on its tread surface and surrounded by, and integral with the homogeneous body 19, which has a margin adapted to be trimmed to fit a leather heel.

The proportion of rubber in the core 18 must be sufficient to insure a homogeneous union between the core and the heel body during vulcanization. Thus the anti-slipping core or filling forms an integral, inseparable part of the structure and cannot become loosened and drop out, so that a common objection to rubber heels with frictional plugs as heretofore made, is overcome by my invention. The binding layer vulcanized both to the body 19 and filling 18, materially adds to the secure confinement of the filling, although the union between the margin of the filling and the body 19 is alone sufficient to insure the retention of the filling in place under ordinary conditions.

The filling 18 differs from a plug composed of a layer of woven fabric coated with rubber cement and rolled into a circular body inserted in the rubber body of the heel. Such plug is united to the heel body only by the thin film or rubber on the outer surface of the plug and is liable to become detached and drop out of the heel body. The filling 18 composed of a mixture of rubber and fibers extending irregularly through the rubber separated from each other more or less thereby, is inseparably connected with the body of the heel by the vulcanizing of the rubber of the heel body and the rubber of the filling.

I claim:

1. A rubber heel comprising a heel body provided with a tread surface and having an antislipping core integral therewith and composed of a plug of rubber having a filling of friction material distributed therethrough, said core extending inwardly from said tread surface, the rubber in said core being in sufficient proportion to insure a homogeneous union of the core with the heel body when vulcanized.

2. A rubber heel comprising a heel body provided with a tread surface and having an antislipping core integral therewith and composed of a plug of rubber having a filling of friction material distributed irregularly throughout the same, said core extending inwardly from the tread surface, the rubber in said core being in sufficient proportion to insure a homogeneous union of the core with the heel body when vulcanized.

3. A rubber heel comprising a heel body provided with a tread surface and having an antislipping core integral therewith and composed of a plug of rubber having a filling of fibrous material irregularly distributed throughout the same, said core extending inwardly from said tread surface, the rubber in said core being in sufficient proportion to insure a homogeneous union of the core with the heel body when vulcanized.

4. A rubber heel comprising a heel body provided with a tread surface and having an antislipping core integral therewith and composed of a plug of rubber having a filling of friction material distributed throughout the same, said core extending inwardly from said tread surface, the rubber in said core being in sufficient proportion to insure a homogeneous union between the core and the heel body when vulcanized, and an integral binding layer of rubber overlying said heel body and the inner end of said core.

In testimony whereof I have affixed my signature, in presence of two witnesses.

ESSEX S. ABBOTT.

Witnesses:
C. F. BROWN,
P. W. PEZZETTI.